United States Patent
Zeng et al.

(10) Patent No.: US 10,730,280 B2
(45) Date of Patent: Aug. 4, 2020

(54) DETERMINE A MANUFACTURING BATCH

(71) Applicant: HEWLETT-PACKARD DEVELOPMENT COMPANY, L.P., Houston, TX (US)

(72) Inventors: Jun Zeng, Sunnyvale, CA (US); Sunil Kothari, Palo Alto, CA (US); Gary J. Dispoto, Mountain View, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 418 days.

(21) Appl. No.: 15/033,877

(22) PCT Filed: Nov. 4, 2013

(86) PCT No.: PCT/US2013/068225
§ 371 (c)(1),
(2) Date: May 2, 2016

(87) PCT Pub. No.: WO2015/065483
PCT Pub. Date: May 7, 2015

(65) Prior Publication Data
US 2016/0279880 A1   Sep. 29, 2016

(51) Int. Cl.
*B29C 67/00* (2017.01)
*B33Y 50/00* (2015.01)
*B05B 1/04* (2006.01)
*B29C 64/386* (2017.01)
*G05B 19/4099* (2006.01)
(Continued)

(52) U.S. Cl.
CPC ............ *B33Y 50/00* (2014.12); *B29C 64/386* (2017.08); *B29C 67/00* (2013.01); *G05B 1/04* (2013.01); *G05B 19/4099* (2013.01); *G06Q 10/0875* (2013.01); *G05B 2219/35153* (2013.01); *G05B 2219/35156* (2013.01)

(58) Field of Classification Search
CPC ... B29C 67/0088; B29C 64/386; B29C 67/00; B33Y 50/00; G05B 1/00; G05B 1/04; G06Q 10/0875
USPC .......................................................... 700/97
See application file for complete search history.

(56) References Cited

U.S. PATENT DOCUMENTS 7,567,850 B2   6/2009  Yamada et al.
7,833,001 B2   11/2010 Silverbrook
(Continued)

FOREIGN PATENT DOCUMENTS

| KR | 20130038101 A | 4/2013 |
| KR | 10-2013-0044649 A | 5/2013 |
| WO | WO-2013-113372 A1 | 8/2013 |

OTHER PUBLICATIONS

Taylor, C.S. et al; "Spatial Forming a Three Dimensional Printing Process"; Mar. 3, 2005.
(Continued)

*Primary Examiner* — Ly D Pham
(74) *Attorney, Agent, or Firm* — HP Inc. Patent Department

(57) ABSTRACT

Examples disclosed herein relate to determining a manufacturing batch. In one implementation, the manufacturing batch relates to 3D printing. A processor may determine component parts of a product that. In one implementation, a processor determines a batch of the component parts related to different products based on a comparison to other potential batches.

19 Claims, 6 Drawing Sheets

(51) Int. Cl.
*G05B 1/04* (2006.01)
*G06Q 10/08* (2012.01)

(56) References Cited

U.S. PATENT DOCUMENTS

| | | |
|---|---|---|
| 8,070,473 B2 | 12/2011 | Kozlak |
| 8,509,933 B2 | 8/2013 | Steingart et al. |
| 2003/0035917 A1* | 2/2003 | Hyman .................. B41M 1/30 428/67 |
| 2003/0065400 A1* | 4/2003 | Beam ...................... A61L 27/12 623/23.51 |
| 2004/0207662 A1 | 10/2004 | Anderson |
| 2005/0001356 A1 | 1/2005 | Tochimoto |
| 2011/0222081 A1 | 9/2011 | Yi |
| 2013/0108726 A1 | 5/2013 | Uckelmann et al. |

OTHER PUBLICATIONS

Ilkka Ikonen, et al; "Concept for a Genetic Algorithm for Packing Three Dimensional Objects of Complex Shape"; Sep. 30, 1996; XP055360172; http://citeseerx.ist.psu.edu/viewdoc/download?doi=10.1.1.47.9632&repl&type=ps.

Linjie Luo; "Chopper: Partitioning Models into 3D-printable Parts"; ACM Transactions on Graphics; vol. 31, No. 6; Nov. 2012.

\* cited by examiner

DETERMINE A MANUFACTURING BATCH

BACKGROUND

Manufacturing may involve making batches of products together, such as batches of products that may be made with the same equipment. 3D printing is a type of manufacturing technology performed by layering material using additive manufacturing technology, such as printing or selected laser sintering. In some cases, 3D printing objects of the same material may be created together in a batch where the same type of material is layered to create objects associated with different products.

BRIEF DESCRIPTION OF THE DRAWINGS

The drawings describe example embodiments. The following detailed description references the drawings, wherein.

DETAILED DESCRIPTION

A manufacturing entity may group parts from different products into batches for manufacturing, such as where parts of the same material are manufactured together. For example, a 3D printing batch may include parts of different products manufactured together such that the parts may be disassembled from one another and may be reassembled in their associated products at the completion of the process. In one implementation, batches of parts manufactured by 3D printing technology may be automatically recommended, such as based on a weighted score taking into account multiple factors. For example, the batches may be selected in a manner that minimizes the amount of support material used due to the particular parts in the batch and the placement in the batch causing the previously manufactured parts to provide support for later manufactured parts. Other selection criteria may include, for example, selecting a batch such that includes the greatest number of parts compared to other potential batches and/or selecting a batch that includes parts related to higher priority orders.

In one implementation, a machine learning method is applied to determine component parts of a product of the same material that may be manufactured together. In one implementation, parts of the same material may be divided into subparts to be manufactured separately and recombined based on the component parts of similar previously manufactured products. For example, there may multiple ways to divide a part of the same material into subparts, and the set of subparts selected for manufacturing may be determined when selecting a potential batch. In some cases, the component parts and/or component subparts of the different products may then be automatically grouped into batches for manufacturing, for example, such that each batch includes parts of different products created from the same material.

Figure 1:
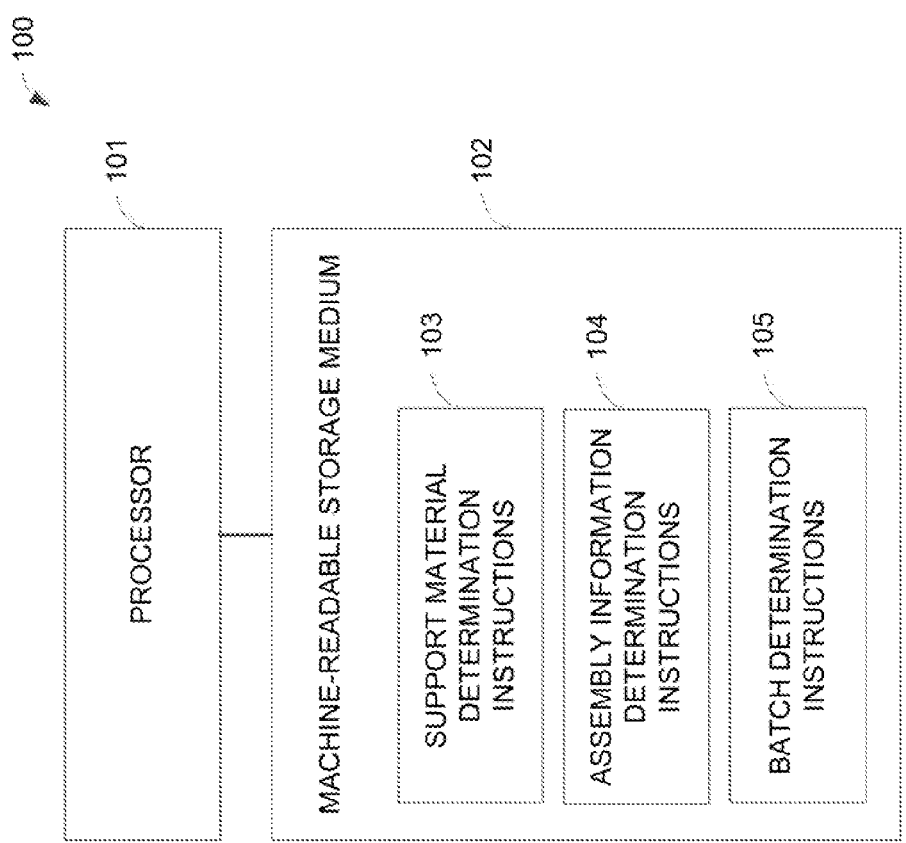
FIG. 1 is a block diagram illustrating one example of a computing system to determine manufacturing batches for 3D printing manufacturing based on the amount of support material used.

FIG. 1 is a block diagram illustrating one example of a computing system 100 to determine manufacturing batches for 3D printing manufacturing based on the amount of support material used. For example, 3D printing may involve adding layers of material to one another using printing technology. Parts of the same material may be manufactured together. Supporting material may be used to support parts that do not attach to the base of a product and may be used to hold the different parts in place to prevent gravity from causing problems with the product during manufacturing. In a batch of parts of different products that are not connected to one another in a single product, support material may be used to support the different parts in the batch. The support material may then be dissolved such that the parts may then be disassembled from the supporting material and reassembled into their respective products. Such a system may be useful, for example, in made-to-order commercial fulfillment setting where multiple orders are received for manufacturing at the same facility with different service level agreements.

The computing system 100 may include a processor 101 and a machine-readable storage medium 102. The computing system 100 may recommend parts from the different products to be manufactured in the same batch based on a comparison of the amount of support material and assembly effort for different batches of parts.

The processor 101 may be a central processing unit (CPU), a semiconductor-based microprocessor, or any other device suitable for retrieval and execution of instructions. As an alternative or in addition to fetching, decoding, and executing instructions, the processor 101 may include one or more integrated circuits (ICs) or other electronic circuits that comprise a plurality of electronic components for performing the functionality described below. The functionality described below may be performed by multiple processors.

The processor 101 may communicate with the machine-readable storage medium 102. The machine-readable storage medium 102 may be any suitable machine readable medium, such as an electronic, magnetic, optical, or other physical storage device that stores executable instructions or other data (e.g., a hard disk drive, random access memory, flash memory, etc.). The machine-readable storage medium 102 may be, for example, a computer readable non-transitory medium. The machine-readable storage medium 102 may include support material determination instructions 103, assembly information determination instructions 104, and batch determination instructions 105.

The support material determination instructions 103 may include instructions used to determine support material used for manufacturing a set of parts in a particular manner with 3D printing technology. For example, where multiple parts of the same material are manufactured together, support material may be used to provide padding until an intermediate part of a different material is manufactured and assembled into the product. In some cases, support material may be used to provide support between parts such that the parts from the different products do not intersect during the production process. In one implementation, the processor 101 determines a potential batch of parts to be manufactured together and determines an arrangement for manufacturing the parts in the batch, such as determining relative part placement and orientation with respect to the build direction.

The part placement and/or part orientation may be optimized, for example, based on providing more parts in a batch and/or based on the mechanical properties of the batch. A division of parts into subparts may be determined, for example, based on the method described in FIG. 6. The part placement and division of parts into subparts may affect how much support material is used. In some cases a previously manufactured part may provide support for a later manufactured part such that less support material is used. The processor may determine the amount of support material used to adequately support the parts in the determined arrangement in a manner that the parts have sufficient space between them and do not overlap. For example, less support material may be desirable, but the manner in which support material is used may result in more assembly effort to reconstruct the products from the batches of parts. In addition, breaking parts into smaller components such that part placement may be done in a manner using less support material may result in greater assembly effort to re-assemble the component parts into the desired products.

The assembly information determination instructions 104 may include instructions to determine assembly information, such as assembly time, number of people, or other assembly effort metrics, associated with a potential batch. The processor may determine an amount of assembly effort for reassembling the parts from the batch into the products, such as where greater assembly time is used when the parts are placed in different batches or positions. In some cases, the assembly effort may be based on the number of components that a part is broken into, such as where a part is manufactured in two pieces in order to provide support for other parts and lessen the amount of support material. For example, a part of a single material may be manufactured as a single part or split into subparts. Manufacturing with more subparts may allow for more potential configurations and result in less supporting material used and more assembly effort. Additional factors may also be taken into account in determining a manufacturing batch, such as maximizing the number of parts in a batch, maximizing number of parts of a certain type in a batch, and/or maximizing the number of parts associated with a particular type of service level agreement.

The batch determination instructions 105 may include instructions to determine how to batch parts from multiple products based on a comparison of the amount of support material used and assembly information for a potential batch. For example, the processor may determine multiple potential ways to batch a set of parts, and the groups of batches for manufacturing the parts for the set of products may be compared based on the amount of support material associated with the particular group of batches and the assembly effort used. Multiple potential batch combinations may be determined where the batches include different parts and/or part placements, and a batch combination may be selected based on a comparison of the support material associated with each batch combination and the assembly effort to assemble the final product from the parts of the different batches.

In one implementation, the machine-readable storage medium 102 further includes assembly instructions related to how to assemble the parts from the different batches into the completed products. The machine-readable storage medium 102 may include post assembly instructions related to additional processing for a product after the component parts have been combined. For example, a surface finishing may be applied to the surface of the product.

Figure 2:
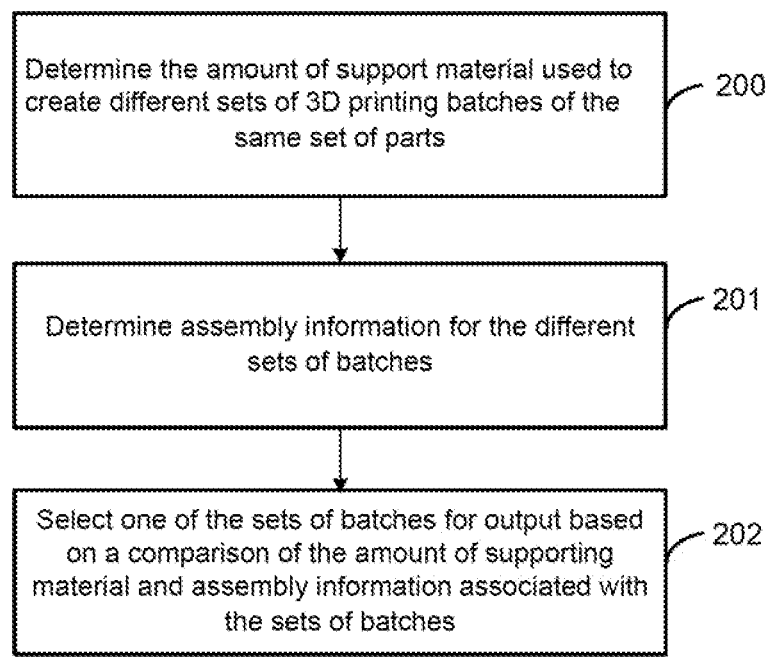
FIG. 2 is a block diagram illustrating one example of a method to determine manufacturing batches for 3D printing manufacturing based on the amount of support material used.

FIG. 2 is a flow chart illustrating one example of a method to determine manufacturing batches for 3D printing manufacturing based on the amount of support material used. For example, product A may include parts 1, 2, and 3, product B may include parts 4, 5, and 6, and product C may include parts 7 and 8. Some of the different parts may be made from the same material, such as where parts 1, 3, 6, and 8 are made from the same material. A processor may determine which parts to include in a 3D manufacturing batch and how to place them within a batch. For example, parts 1, 3, 6, and 8 may be manufactured together or parts 1 and 3 may be manufactured together and parts 6 and 8 may be manufactured together. The processor may determine a placement of the different parts in a batch and the amount of supporting material used for the particular placement. The method may be implemented, for example, by the processor 101 from FIG. 1.

Beginning at 200, a processor determines the amount of support material used to create different sets of 3D printing batches of the same set of parts. For example, the processor may receive a list of component parts associated with a set of products and a list of potential subparts that the components parts may be broken into. The processor may receive material information such that parts of the same material may be grouped together. In some cases, different products may include some parts that are the same that are created from the same material. The processor may form sets of manufacturing batches from the parts such that parts of the same material are batched together. The processor may further determine part placement within the batches for 3D printing.

The parts may be placed and oriented such that some parts provide support for other parts, and extra supporting material may be used to prevent parts from intersecting. The amount of support material may be determined, for example, by creating a 3D print STL file associated with the components and placement of parts in a batch and determining the amount of support material based on surface triangles indicated in the STL file.

Continuing to 201, the processor determines assembly information for the different sets of batches. For example, the assembly effort may be greater where the component parts are divided into subparts, such as for the purpose of orienting the parts to support one another to result in less extraneous supporting material. The assembly information may be determined, for example, based on stored assembly information related to similar products and component divisions. In one implementation, the assembly information is determined based on the number of component parts. In some cases, the assembly time is determined based on the set of batches instead of or in addition to the assembly time based on a single batch. For example, dividing the manufacturing into more batches may result in greater assembly time to assemble the product from more batches. The time to assemble may be increased based on waiting time for additional batches.

Continuing to 202, the processor selects one of the sets of batches for output based on a comparison of the amount of supporting material and assembly information associated with the sets of batches. For example, a score may be associated with each of the sets of batches where the score represents a comparison of the supporting material and assembly information, such as where more supporting material and greater assembly subtracts from the score. The potential batches and scores may be updated as more orders are received. For example, batch information may be output for existing orders and may be updated when additional orders are received.

In one implementation, additional factors are considered in selecting a potential batch from the sets of batches. For example, the number of parts in the batch, the parts of a certain type in a batch, or the service level agreement associated with products with the parts in the batch may be considered. The factors may be weighted according to a default weighting scheme or based on user input providing information about the relative importance of the factors.

Information related to the selected batch may be output for manufacturing. STL files may be created for the batches within the selected set of batches. The STL files may be sent to 3D printers for manufacturing the parts associated with the desired products.

Figure 3:
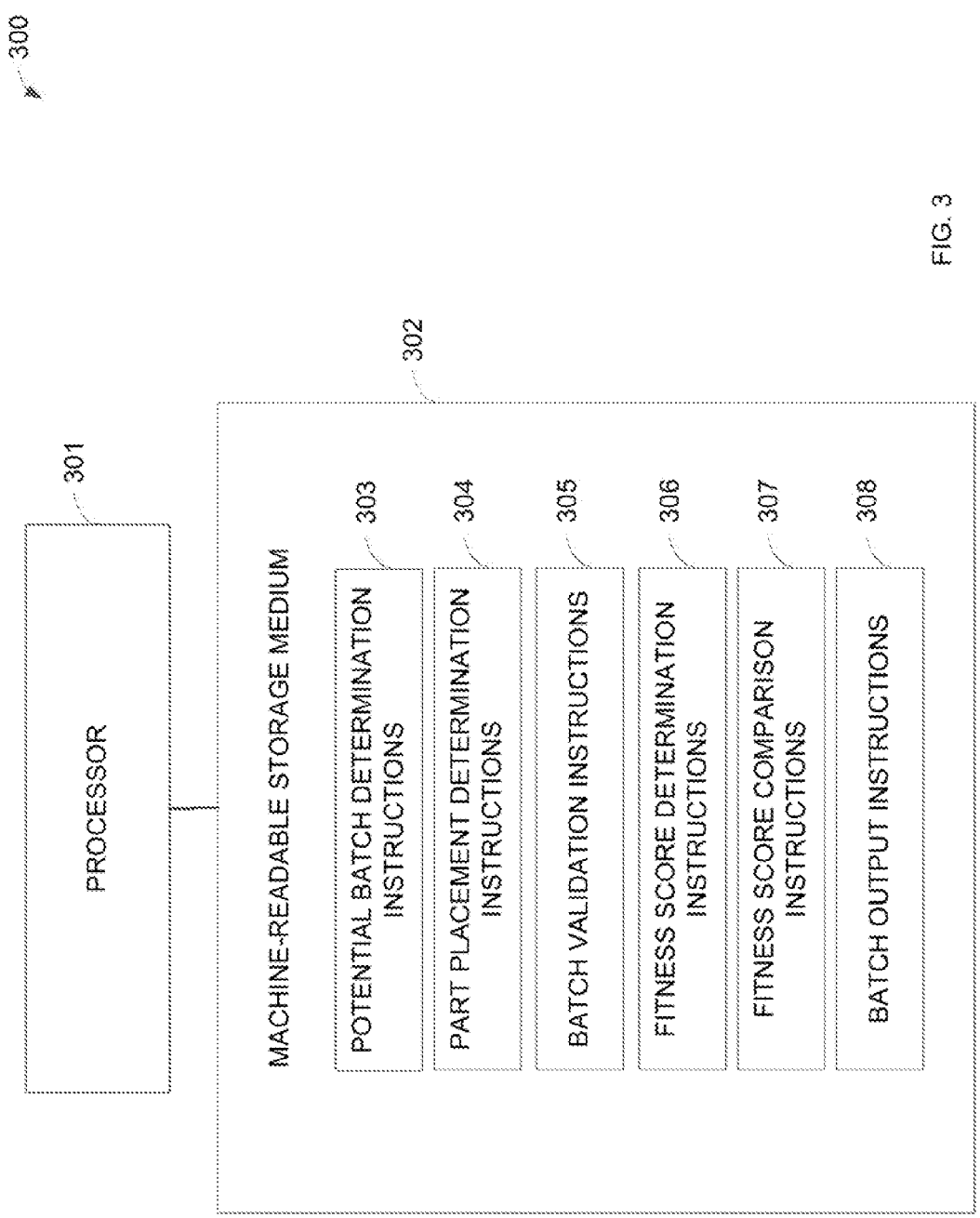
FIG. 3 is a block diagram illustrating one example of a computing system to determine a batch of parts to manufacture using 3D printer technology.

FIG. 3 is a block diagram illustrating one example of a computing system 300 to determine a batch of parts to manufacture using 3D printer technology. The batch may include parts from different products that are made from the same material such that the parts may be manufactured together. The part placement and orientation may also be determined. A batch may be selected from a set of potential batches based on a score associated with the batch indicating the desirability of the particular batch. For example, a potential batch may be determined and it may be selected for manufacturing where a score associated with the batch is greater than a score associated with another batch. Factors such as the amount of supporting material, the number of parts in a batch, and other factors may be taken into account. The computing system 300 includes a processor 301 and a machine-readable storage medium 302.

The processor 301 may be a central processing unit (CPU), a semiconductor-based microprocessor, or any other device suitable for retrieval and execution of instructions. As an alternative or in addition to fetching, decoding, and executing instructions, the processor 301 may include one or more integrated circuits (ICs) or other electronic circuits that comprise a plurality of electronic components for performing the functionality described below. The functionality described below may be performed by multiple processors.

The processor 301 may communicate with the machine-readable storage medium 302. The machine-readable storage medium 302 may be any suitable machine readable medium, such as an electronic, magnetic, optical, or other physical storage device that stores executable instructions or other data (e.g., a hard disk drive, random access memory, flash memory, etc.). The machine-readable storage medium 302 may be, for example, a computer readable non-transitory medium. The machine-readable storage medium 302 may include potential batch determination instructions 303, part placement determination instructions 304, batch validation instructions 305, score determination instructions 306, score comparison instructions 307, and batch output instructions 308.

The potential batch determination instructions 303 may include instructions for determining a potential batch of components to manufacture together. Multiple potential batches may be determined and compared, and batches may be selected for manufacturing from the list of potential batches. For example, multiple different sets of parts may be determined. The part placement determination instructions 304 includes instructions to determine part placement and orientation for parts manufactured together in the same batch, such as where the parts may in some cases support one another in different manners. The batch validation instructions 305 include instructions to verify the potential batch, such as to confirm that support material is used in a manner that prevents parts from overlapping. The score determination instructions 306 include instructions to associate a score with the potential batch indicating the desirability of the particular batch based on a set of factors. The score comparison instructions 307 include instructions to compare scores of different batch combinations to select a batch or set of batches to be manufactured. The batch output instructions 308 includes instructions to output information about a selected manufacturing batch.

The machine-readable storage medium 102 may include assembly instructions related to how to assemble the parts from the different batches into the completed products. For example, the parts from the different batches may be automatically or manually combined into the desired products based on assembly specifications. The machine-readable storage medium 102 may include post assembly instructions related to additional processing for a product after the component parts have been combined. For example, a surface finishing may be applied to the surface of the product. The post processing may occur automatically or may be related to instructions output to be manually performed, such as where the post processing instructions are displayed by the processor 101.

Figure 4:
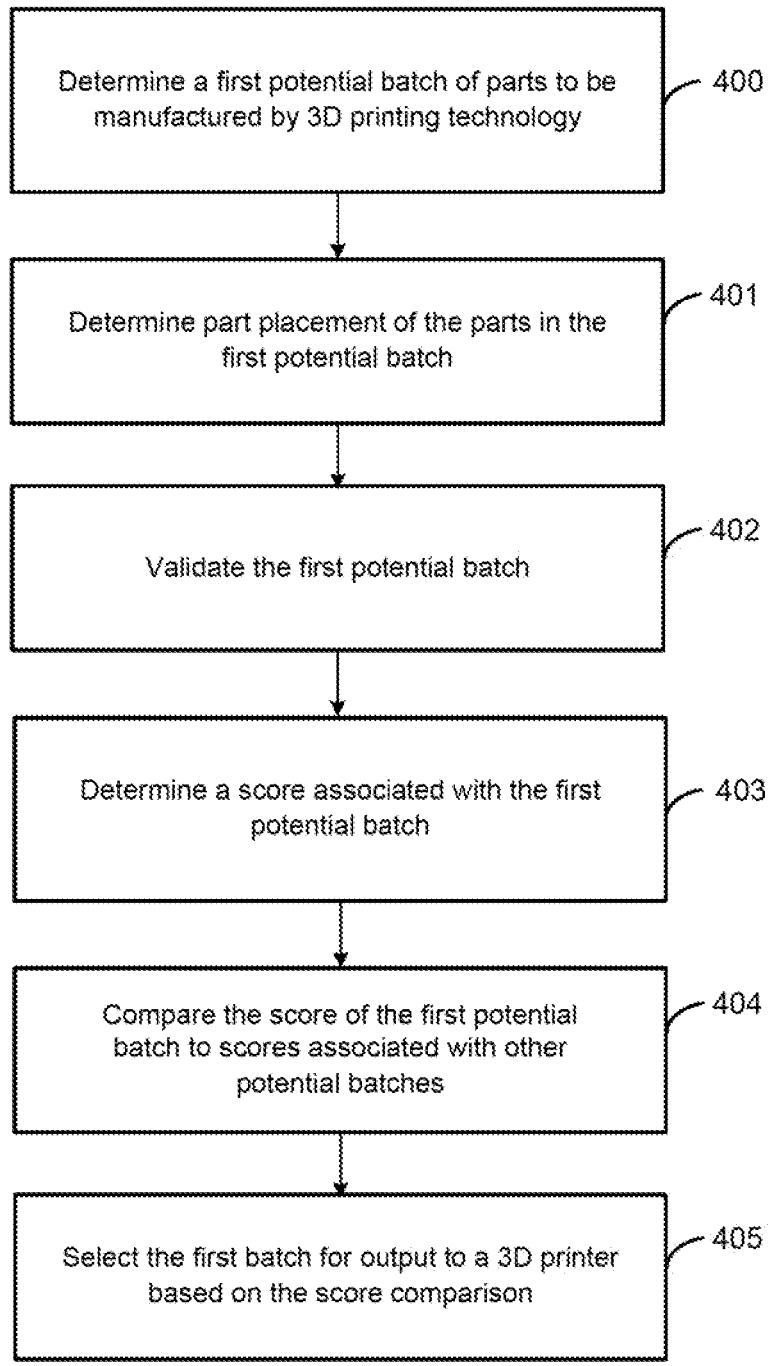
FIG. 4 is flow chart illustrating one example of a method to determine a batch of parts to manufacture using 3D printer technology.

FIG. 4 is flow chart illustrating one example of a method to determine a batch of parts to manufacture using 3D printer technology. For example, a set of parts may be associated with product orders. A subset of the parts may be made from the same material. The subset of parts of the same material may be grouped together in different batches for manufacturing. Some batches may be more desirable than others, such as due to the type of parts, the resulting assembly time after manufacturing, or an increase cost associated with the particular batch combination. A batch may be automatically recommended by a processor that creates and compares potential part combinations forming different manufacturing batches. The method may be implemented, for example, by the processor 301 of FIG. 3.

Beginning at 400, a processor determines a first potential batch of parts to be manufactured by 3D printing technology. The manufacturing technology may include, for example, pure 3D printing technology or hybrid 3D printing technology. The first potential batch may be selected in any suitable manner, such as using a genetic method. The genetic method may include creating multiple gene representations of different batches of parts combined into a chromosome representation of the set of batches used to create the parts associated with a group of products.

Continuing to 401, the processor determines part placement of the parts in the first potential batch. The part placement may include information about the relative position of parts in a product and the relative orientation of parts of the product. For example, with 3D printing technology, the manufactured parts may use support material to keep parts from intersecting with one another. In some cases, the parts may be placed and oriented in a manner such that the a first part provides support for a second part manufactured at a later time, and less or no support material is used between the two parts.

In one implementation a set of potential parts and subparts may be received, such as from a storage. In some cases, the parts and subparts may be determined based on, for example, the method described in FIG. 6 below. The processor may determine how to batch the parts of the same material and determine whether to divide some or all of the parts into subparts. In some cases, there may be multiple subpart options for the same part, and the processor determines which subpart division results in a better batch combination, such as due to less supporting material being used. In some cases, the processor takes into account both the amount of supporting material and the assembly time associated with the batch.

In one implementation, a genetic method is used where a potential batch is selected, and batching, placement, and orientation decisions are then made by the processor for the parts selected for the potential batch. The processor may determine the amount and placement of support material and simulate the parts in the batch being manufactured together.

Continuing to 402, the processor validates the first potential batch. Validating the batch may include for example, determining that the potential part placement meets certain criteria to ensure a plausible batch, such as the parts being a safe distance apart without intersection between the parts. For example, if a potential batch of parts cannot be placed in a manner that may be validated, the method goes no further with the particular batch, and the processor determines another potential batch. For example, the batch may include a placement such that enough room is not left for an adequate amount of supporting material. The validation may include other factors, such as the likelihood of the resulting parts' mechanical properties meeting minimum requirements of service contracts related to the products with parts in the batch.

Continuing to 403, the processor determines a score associated with the first potential batch if the potential batch is validated. The score may indicate a desirability level of the first potential batch and placement based on a set of factors. The factors may be supplied or weighted based on user input. In some cases, the factors are automatically adjusted, such as based on a season, service level agreement, or information about the condition of equipment. The factors may include, for example, the number of parts in the batch, the parts of a certain type in the batch, and the parts associated with a particular service level agreement of products associated with parts in the batch. The score may include a factor based on the amount of support material used. For example, in batch placement where previously manufactured parts provide less support to later manufactured parts, more support material may be used to provide the proper spacing between the components. The amount of support material may be determined by creating a 3D print STL file associated with the components and placement of a batch and determining the amount of support material based on surface triangles indicated in the STL file. The score may include a factor associated with the assembly time or effort. For example, a batch that breaks a part into more components may involve greater assembly effort. The score may weigh the lesser support material against the possibility of greater assembly cost. The relative importance of the different factors may be adjusted based on a weighting scheme. In some cases, user input may be provided to select the factors and/or weight them relative to one another.

Continuing to 404, the processor compares the score of the first potential batch to scores associated with other potential batches. For example, the batch with the greatest or least score may be selected. In some cases, a genetic method is applied that continually creates new batches with different parts and/or different part placement. The genetic method may stop optimizing the batches when a signal is received that indicates that output is desired, such as when the output STL file for the 3D printing is requested. The parts included in the batch may be deleted from the set of parts to be manufactured, and a genetic method may be applied to determine the next batch to be manufactured.

Continuing to 405, the processor selects the first batch for output to a 3D printer based on the score comparison. For example, the batch with the least or greatest score may be selected. Additional processing may be applied to the batch before output. For example, the processor may generate slicing planes and support layers for the batch. Outputting information about the batch may include storing, transmitting, or displaying information about the parts in the selected batch. The processor may create or receive and STL file related to the selected batch. Multiple batches including the different products may be output such that between the different batches the parts to compose the requested products are included. In some cases, the STL file may automatically be routed to the proper equipment.

Figure 5:
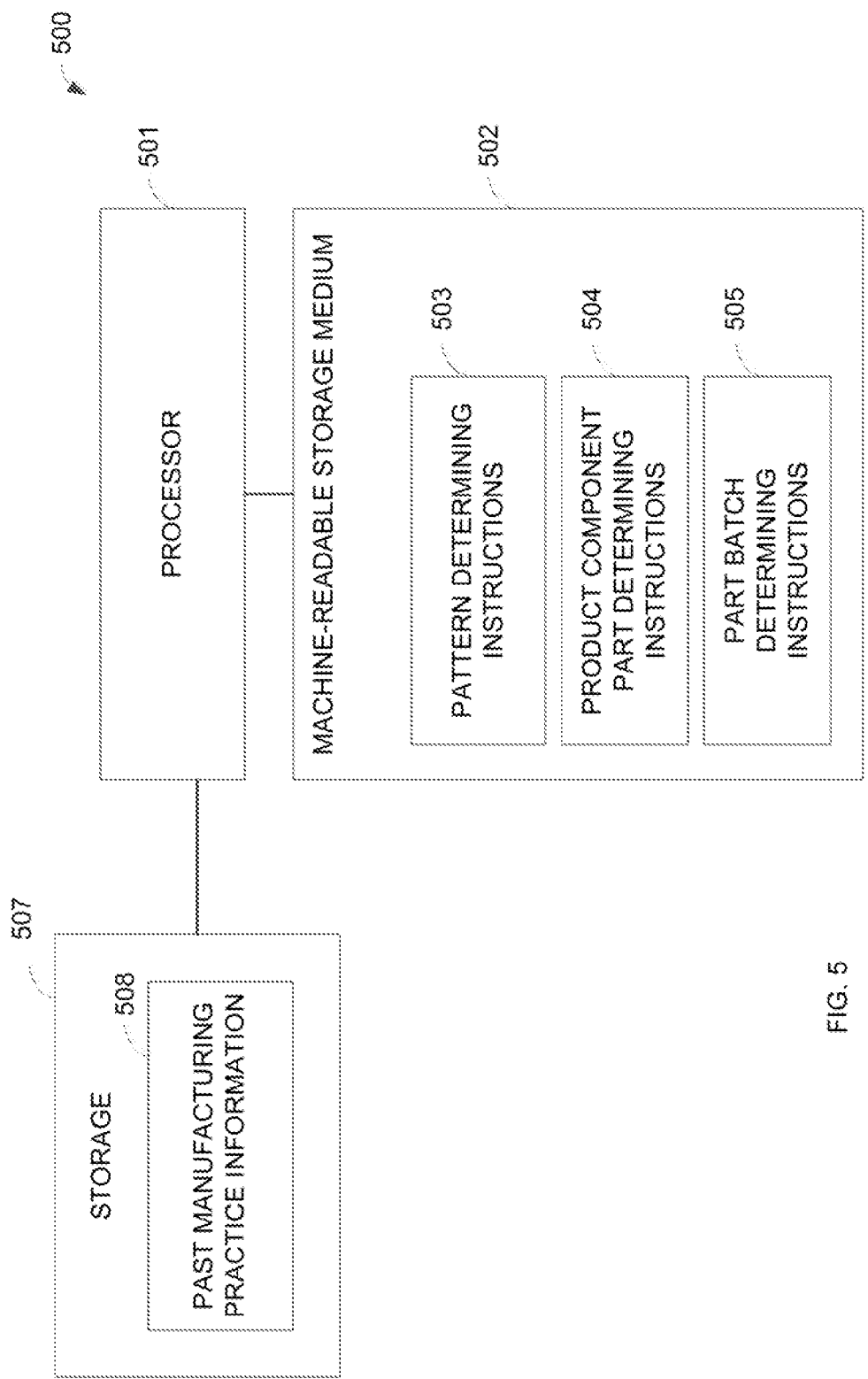
FIG. 5 is a block diagram illustrating one example of a computing system to determine a manufacturing batch based on component parts of a product.

FIG. 5 is a block diagram illustrating one example of a computing system 500 to determine a manufacturing batch based on component parts of a product. For example, a manufacturing order may be divided into component parts such that parts of the same material may be manufactured together. The component parts may be combined from the different batches after manufacturing to create the desired product. In some cases, multiple product orders may be combined such that component pieces of the same material are manufactured in the same batch, and the manufactured pieces may then be added to different products.

The computing system 500 includes a processor 501, a storage 507, and a machine-readable storage medium 502. The storage 507 may include, for example, past manufacturing practice information 508. The past manufacturing practice information 508 may include any suitable information about how past manufacturing orders were fulfilled. For example, the past manufacturing practice information 508 may include information about how orders were combined, which machines manufactured which pieces of the products, or how parts of a single material were divided into subparts.

The storage 507 may communicate directly with the processor 501, such as where the storage 507 and the processor 501 are in a single electronic device, or the storage 507 and the processor 501 may communicate via a network, such as in a cloud based system.

The processor 501 may be a central processing unit (CPU), a semiconductor-based microprocessor, or any other device suitable for retrieval and execution of instructions. As an alternative or in addition to fetching, decoding, and executing instructions, the processor 501 may include one or more integrated circuits (ICs) or other electronic circuits that comprise a plurality of electronic components for performing the functionality described below. The functionality described below may be performed by multiple processors.

The processor 501 may communicate with the machine-readable storage medium 502. The machine-readable storage medium 502 may be any suitable machine readable medium, such as an electronic, magnetic, optical, or other physical storage device that stores executable instructions or other data (e.g., a hard disk drive, random access memory, flash memory, etc.). The machine-readable storage medium 502 may be, for example, a computer readable non-transitory medium. The machine-readable storage medium 502 may include pattern determining instructions 503, product component part determining instructions 504, and part batch determining instructions 505.

The pattern determining instructions 503 may include instructions about determining manufacturing patterns based on the past manufacturing information 108. For example, a particular manufacturing environment may manufacture items different according to the type of equipment, the capacity of the equipment, or the state of the equipment. The manufacturing environment may have policies related to the particular environment, such as a prioritization of particular types of products. The determined patterns may be any suitable pattern information related to patterns as to how pieces of manufacturing orders are batched together. The patterns may be determined using a machine learning method. In one implementation, the manufacturing patterns also relate to breaking an order into a list of products. For example, a machine learning method may be used to determine how orders are broken into products in the particular manufacturing environment, such as related to a format of order documents that is typically received by the particular manufacturer.

The product component part determining instructions 504 may include instructions to determine individual components of products of the same material that may be manufactured in the same batch. For example, the determined patterns may be used to determine how a product may be divided into different components. A specification of a product may indicate different portions of a different product, and the determined patterns may be used to determine how portions of the same material may be broken in individual components and sub-components. For example, a part of a product of the same material may be created as a single part or broken into subparts that can later be combined into the single part. In some cases, there are multiple ways to break the part into subparts, and different options may be determined by the processor. The different subpart combinations may be taken into account, for example, in the method of FIG. 4. The product component part determining instructions 504 may include instructions related to dividing parts of a product of the same material into subparts based on the determined patterns. For example, the parts of the same material may be manufactured separately and then recombined when the product is assembled. The part may be divided into subparts, for example, in order to manufacture the parts more quickly among multiple machines.

The part batch determining instructions 505 may include instructions to determine component parts of the same material from different products and/or orders for manufacturing components of the same material together. For example, the determined component parts of the same material may be manufactured together. The component parts of the same material may be grouped into batches for manufacturing. In some implementations, the grouping into batches is done based on determined previous grouping patterns.

Figure 6:
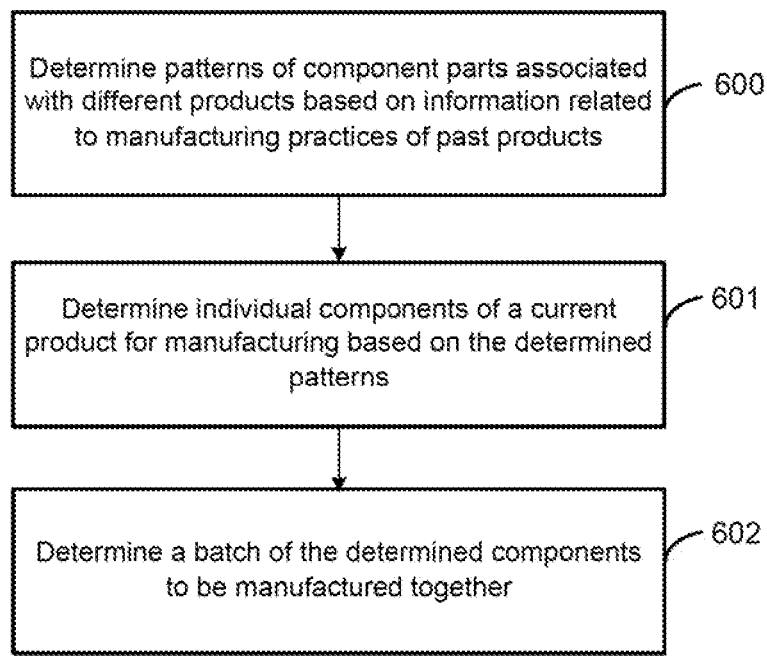
FIG. 6 is a flow chart illustrating one example of a method to determine a manufacturing batch based on component parts of a product.

FIG. 6 is a flow chart illustrating one example of a method to determine manufacturing batches based on component parts of a product. The method may be applied to a cloud system for receiving multiple manufacturing orders, and the method may be used to manufacture parts from the different orders together. As an example, a made-to-order commercial fulfillment setting may receive multiple for manufacturing products at the same facility where the different orders have different service level agreements. A manner of dividing sections of a product of the same material into components may be based on the manner in which a previously manufactured similar product was divided into components of the same material. The method may be implemented, for example, by the processor 501 of FIG. 5.

Beginning at 600, a processor determines patterns of component parts associated with different products based on information related to manufacturing practices of past products. For example, a particular manufacturing entity may have practices related to how individual components of a product are manufactured and then assembled together, such as with glue, fire, or bounding material. An analysis of product specification and fabrication capability may be conducted by analyzing previous orders to the manufacturing entity. For example, a product may be divided into a particular number or shape of components based on the equipment capabilities. Additional factors may be considered, such as where the same product is divided into components differently according to the desired production speed evidenced by a service level agreement deadline.

Continuing to 601, the processor determines individual components of a current product for manufacturing based on the determined patterns. In one implementation, component parts of products are determined based on the similarity to previously manufactured products. For example, a product and/or order is compared to stored information related to the manufacturing of products. Information related to a similar past order and/or a set of similar past orders may be used to determine a likely division of component parts for manufacturing. The similarity may be based on factors related to the product to be manufactured, the type of order or agreement, or the type of equipment to be used to produce the order. A similarity score may be determined, and past orders with the highest similarity or a similarity to the current order above a threshold may be considered. In some cases, the order is compared to summary information related to classes of past orders instead of or in addition to comparing the current order to individual previous orders.

A current order may be broken into components in the same or similar manner as the most similar past order or a past order with a similarity above a threshold. In some cases, the processor first divides an order into products, such as based on a line analysis of the purchase agreement or invoice, and then determines component parts associated with each of the products.

In one implementation, the processor divides a product into a list of parts and where each part is made from a single material. The processor may further divide the parts made from the single material into a multiple parts of the material that may be assembled after manufacturing. The processor may determine multiple manners of dividing the part of the same material into subparts, and the processor may select one of the subpart combinations or select to manufacture the part as a single part.

In some cases, the manufacturing practice may involve 3D printing, and the processor may determine partition planes related to the component parts. The recommended partition planes may be based on partition planes used in previous similar orders/products. The processor may further determine assembly information based on previous similar orders/products. For example, particular features may be added to make assembly simpler when a particular set of partition planes are used.

Moving to 602, the processor determines a batch of the determined components to be manufactured together. For example, component parts of the same material from different products and/or orders may be manufactured in the same batch. In some cases, where the parts are manufactured such that parts are divided into subparts of the same material, subparts may be dovetailed to aid in assembly of the subparts into the part of the same material. In the case of 3D printing, the batch may be determined according to the method of FIGS. 2 and/or 4.

The invention claimed is:
1. A method, comprising:
   determining a first potential batch of parts to be manufactured by 3D printing technology, wherein the parts are associated with multiple products;

determining part placement of the parts in the first potential batch;
validating the first potential batch, wherein the validation comprises determining the distance between parts in the part placement;
determining a score associated with the first potential batch;
comparing the score of the first potential batch to scores associated with other potential batches; and
selecting the first batch for output to a 3D printer based on the score comparison and outputting the first batch to the 3D printer to manufacture the first batch of parts,
wherein the score of a batch is based on at least one of:
the number of parts in the batch,
the parts of a certain type in the batch,
the parts associated with a particular service level agreement of products associated with parts in the batch; and
the amount of support material in the batch.

2. The method of claim 1, further comprising dividing a product into parts to be placed in potential batches based on the parts of a past product order with a similarity to the product above a threshold.

3. The method of claim 1, further comprising:
creating an STL file associated with the first potential batch;
determining the amount of support material based on surface triangles indicated in the STL file; and
determining the score based on the amount of support material.

4. The method of claim 1, further comprising determining the first potential batch based on a genetic method to create a potential batch from a list of parts.

5. The method of claim 4, wherein the genetic method comprises creating multiple gene representations of different batches of parts combined into a chromosome representation of the batches used to create the parts associated with a group of products.

6. The method of claim 1, further comprising:
determining the amount of support material used to create each potential batch of the same set of parts;
determine assembly information for the different potential batches; and
select one of the potential batches for output based on a comparison of the amount of support material and assembly information associated with the batches.

7. The method of claim 6, further comprising determining the component parts of a product in a received order based on the similarity of the product to a product in a past order.

8. The method of claim 6, further comprising determining 3D print partition planes associated with each of the potential batches.

9. The method of claim 6, further comprising selecting one of the batches based on weighted factors including at least one of: the number of parts in the batch, the parts of certain type in the batch, and the parts associated with a particular service level agreement of products associated with parts in the batch.

10. The method of claim 1, further comprising operating a computing system, comprising:
a storage to store information related to manufacturing practices of past products;
a processor to:
determine patterns of component parts associated with different products based on the stored information;
determine individual components of a current product for manufacturing based on the determined patterns; and
determine a batch of the determined components to be manufactured together.

11. The method of claim 10, wherein determining individual components comprises determining individual components based on a pattern associated with a past product with a similarity level above a threshold with the current product.

12. The method of claim 10, wherein the processor is further to determine 3D print partition planes to be associated with the determined set of components based on partition planes associated with the past products.

13. The method of claim 10, wherein the processor is further to determine a manner of dovetailing the components to be reassembled to create a product.

14. The method of claim 10, wherein determining a batch comprises:
determining the amount of support material used to create different sets of 3D printing batches of the same set of parts;
determining assembly information for the different sets of batches; and
selecting one of the sets of batches for output based on a comparison of the amount of support material and assembly information associated with the sets of batches.

15. The method of claim 1, further comprising:
with a processor, receiving a list of parts to be manufactured from a same material;
with the processor, determining multiple potential batches of the parts, each batch comprising a number, orientation and placement of at least some of the parts to be manufactured;
with the processor, scoring each potential batch of the parts based on a comparison of support material associated with each batch and an assembly time associated with each batch;
with the processor, selecting a set of the potential batches that includes all the parts to be manufactured while minimizing support material used and assembly effort for the parts of that batch; and
with the processor, outputting the selected set of potential batches to a manufacturing environment to manufacture the component parts in the batches selected.

16. The method of claim 15, furthercomprising, with the processor validating each potential batch by verifying an adequate amount of space and support between the parts of that batch.

17. The method of claim 15, wherein parts are arranged in the potential batches such that a first part provides support fora second part in that batch.

18. The method of claim 15, wherein the manufacturing environment comprises a number of three-dimensional printers and the processor outputs an STL file to the manufacturing environment.

19. The method of claim 15, wherein determining multiple potential batches of the parts comprises referring to past manufacturing practice information regarding a similar list of parts to be manufactured.

* * * * *